Dec. 2, 1958 C. W. SNOW ET AL 2,862,545
INJECTOR
Filed March 29, 1954 2 Sheets-Sheet 1
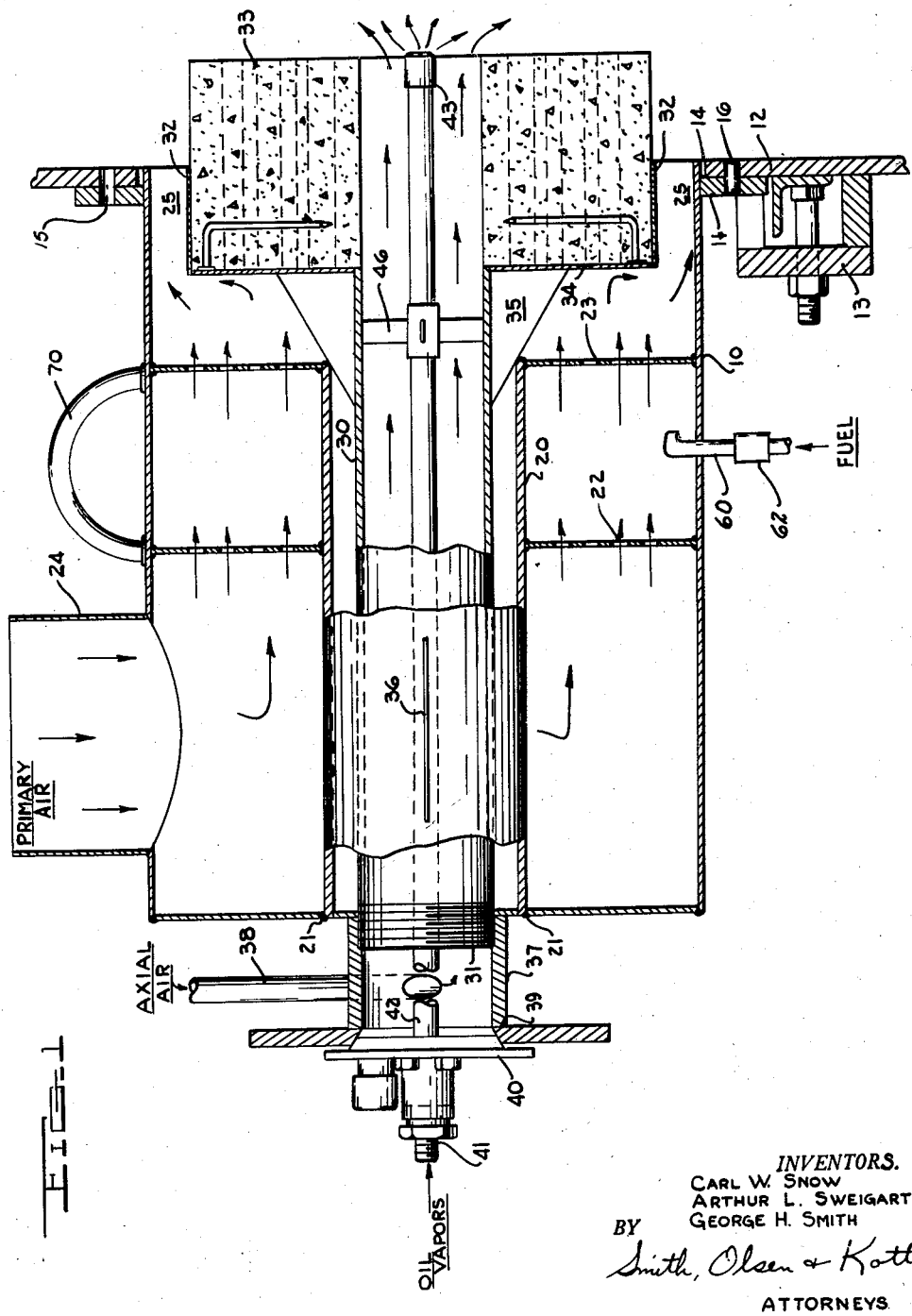
INVENTORS.
CARL W. SNOW
ARTHUR L. SWEIGART
BY GEORGE H. SMITH
Smith, Olsen & Kotts
ATTORNEYS Dec. 2, 1958   C. W. SNOW ET AL   2,862,545
INJECTOR
Filed March 29, 1954   2 Sheets-Sheet 2
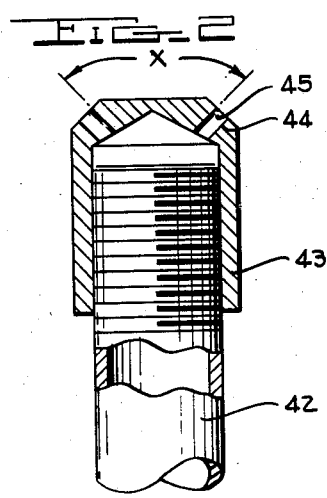
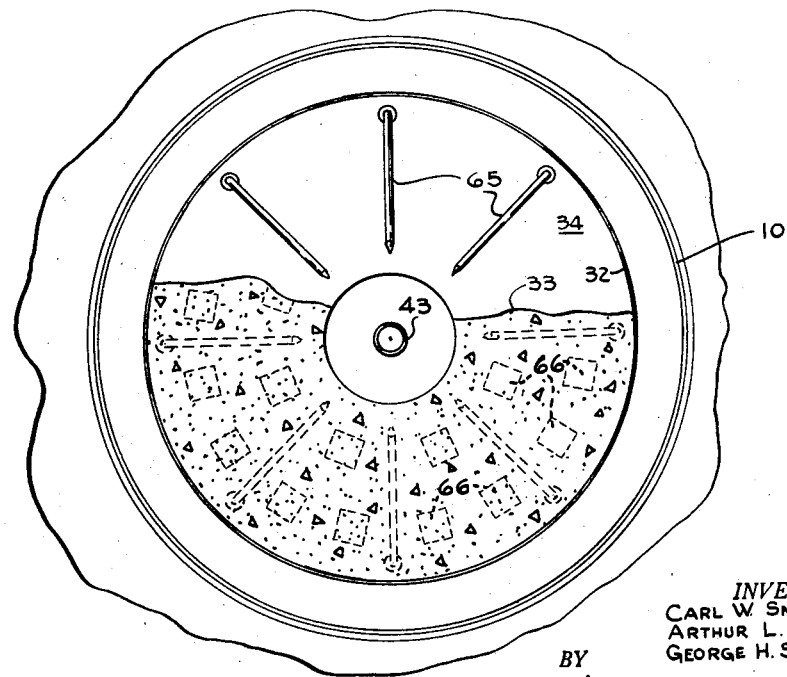
INVENTORS.
CARL W. SNOW
ARTHUR L. SWEIGART
BY GEORGE H. SMITH
*Smith, Olsen & Kotts*
ATTORNEYS

# 2,862,545
INJECTOR Carl W. Snow and Arthur L. Sweigart, Borger, and George H. Smith, Shamrock, Tex., assignors to United Carbon Company, Inc. (Maryland), Charleston, W. Va., a corporation of Maryland Application March 29, 1954, Serial No. 419,404

2 Claims. (Cl. 158—11)

The present invention relates to an injector particularly adapted to supply (1) a combustible mixture of hydrocarbons and air, and (2) hydrocarbons essentially not admixed with air, to a furnace for the process of carbon black formation.

This application is a continuation-in-part of application Serial No. 357,722, filed May 27, 1953, in the names of Carl W. Snow and George H. Smith entitled "Process For The Manufacture of Carbon Black" and now abandoned.

It is an object of the present invention to provide an injector for use particularly, but not exclusively, in convertors or furnaces for the production of carbon black and in which a combustible mixture of air and hydrocarbons is burned to provide the temperatures necessary to decompose essentially unburned hydrocarbons, otherwise injected, and form carbon black therefrom.

It is a further object of the present invention to provide an injector with the component parts thereof arranged in a novel combination for the purpose of providing the following unitary, novel and unobvious results which have been long sought after in the art of producing carbon black by the furnace process:

(1) The complete burning of a combustible hydrocarbon-air mixture prior to injection therein of another partially combustible hydrocarbon-air mixture, without employing tangential injection.

(2) The accurate and precise control of the carbon forming reaction by means of the injector design and its control which assures production of the desired time and temperature patterns within the furnace or converter and results in controlling both the quality and yield of carbon black resulting therefrom.

(3) The control of the direction of air flow through the several parts of the injector to provide a turbulent mass of primary air directed longitudinally of the injector and which is discharged as a hollow circumferential sheath or ring which is spaced from but concentric with the injector nozzle spray head.

(4) The injection of a turbulently admixed hydrocarbon into the primary air stream to form a combustible mixture which is injected adjacent the inner walls of the converter or furnace and burned within said converter or furnace to supply heat for carbon black formation therein.

(5) The injection of all hydrocarbons used in the process under optimum conditions to provide, in effect, a two stage reaction in which a combustible mixture of hydrocarbon and air is first burned and a second mixture of hydrocarbon and air, less than is required for its combustion, is then injected into the burned and burning mixture resulting from the first stage of combustion, thereby permitting accurate control over the entire carbon forming reaction.

Other objects of the invention will appear from the following description and appended claims, reference being had to the accompanying drawings, forming a part of this specification and wherein like reference characters designate corresponding parts in the several views.

In the drawings:

Fig. 1 is a longitudinal view partially in section, of an injector embodying the present invention.

Fig. 2 is an enlarged fragmentary side elevation partially in section of an injector nozzle spray head embodying the present invention.

Fig. 3 is an enlarged fragmentary plan view partially broken away showing the discharge end of an injector embodying the present invention.

Before explaining the present invention in detail, it is to be understood that the invention is not limited in its application to the details of construction and arrangement of parts illustrated in the accompanying drawings, since the invention is capable of other embodiments and of being practiced or carried out in various ways. Also, it is to be understood that the phraseology or terminology employed herein is for the purpose of description and not of limitation.

Referring to Fig. 1, the injector of the present invention comprises a cylindrical shell 10 closed at one end and open at its opposite end. A circumferential mounting flange 11, is provided adjacent the open end of said shell and is secured to the end wall 12 of the furnace or converter (not shown) by a plurality of clamps 13 secured to said end wall 12 and spaced circumferentially around the opening 14 into which projects the open end of said shell 10. If desired, the said mounting flange is drilled with a plurality of locating holes 15 which mate with extending studs 16 secured to the end wall 12 of the said furnace or converter.

A longitudinal tubular sleeve 20 is mounted concentrically within said shell 10 and is closed at the end abutting the closed end of said shell 10 and is open at the end adjacent the open end of the said shell 10. The said sleeve 20 is maintained in position as by welding its one end at the points 21 to the closed end of said shell 10 and by welding to the central annulus of the longitudinally spaced perforated air baffle members 22 and 23 which are secured at their outer circumferences to the shell 10. Thus, the tubular sleeve 20 provides an inner tunnel or duct extending longitudinally through the said shell 10 from the air baffle 23 to the closed end thereof.

A primary air connection 24, is provided in said shell 10 between the closed end thereof and the air baffle 22. Primary air flows through said connection 24 as indicated by the arrows and swirls around the outer surface of said sleeve 20. This air is then discharged through the perforations in said air baffles 22 and 23 and then into the discharge space 25.

Inside the sleeve 20 an axial air tube 30 is concentrically mounted. At one end the said axial air tube 30 is screw threaded as at 31 and extends outwardly through the closed end of said shell 10. The opposite end of said tube 30 is provided with an annular cup-shaped member 32 in which is mounted a refractory annulus 33. Extending between the bottom 34 of the cup-shaped member 32 and the outer wall of said tube 30 are a plurality of symmetrically spaced angular supporting members 35 which are secured, as by welding, to the said bottom 34 and to the outer wall of said tube 30. The angular supporting members 35 each flare outwardly from said tube 30 to act as locating spaces when placed in contact with the open end of said sleeve 20 as shown in Fig. 1.

Two longitudinally extending spacers 36 are secured to the outer surface of said tube 30 and contact the inner circumferential walls of said sleeve 20 to support and space said tube 30 concentrically inside said sleeve 20.

A screw threaded header 37 engages the extending screw threaded end portion 31 of the sleeve 30 exteriorly of the closed end of the shell 10. The screw threaded header 37 is provided with an axial air line 38 which discharges the air tangentially inside said header. The header 37 has a central annulus 39 which is closed by a removable cap 40.

The removable cap 40 carries a centrally located connector 41 for connection with a source of hydrocarbons which preferably are heated vapors of hydrocarbon oils. The axial hydrocarbon injector pipe 42 is connected with said connector 41 and extends longitudinally therefrom to a point adjacent the exposed face of the refractory 33 where it is capped by a screw threaded cap member 43.

As shown in detail in Fig. 2, the circumferential edge 44 of the cap member 43 is provided with a flat angular surface through which are drilled a plurality of equally spaced circumferential ports 45 from which separate hydrocarbon streams are discharged. In a preferred embodiment of the present invention, the flat surfaces of the edge 44 are so drilled that the ports 45 extend at approximately 45 degrees to the center line of the cap 44, and thus at an approximate 90 degree included angle $x$ between diametrically opposed ports. Any desired number of ports 45 may be provided but in a preferred embodiment, we recommend 12 ports equally spaced about the circumferential edge of said cap member 43.

It is possible to vary the angle $x$ of the said ports 45 within the general limits of from approximately 60 to approximately 120 degrees of included angle. Likewise, the numbers of said ports may be varied in number from a minimum of six to a maximum of twenty. Twelve is a preferred number. The ports may range in size as desired but it is recommended that the minimum diameter used is 1/16" and the maximum diameter used is 5/32". The preferred diameter appears to be 3/32".

A spider 46 surrounds the injector pipe 42 and acts as a spacer and support therefor when placed inside said tube 30.

Hydrocarbons are fed into the said axial injector pipe 42 and discharged as a plurality of separate streams extending angularly outward from said cap 43. Axial air under pressure from the axial air supply pipe 38 flows between said pipe 42 and said tube 30 and is discharged as a generally longitudinal air stream. The mixture of the separate hydrocarbon streams and air first occurs at this point. The hydrocarbon thus discharged is the hydrocarbon to be used as the primary source of carbon black production.

The air supplied thereto is in all instances less than that required for the complete combustion of the hydrocarbon.

Heat for the reaction is furnished by the combustion of the mixture of the primary air and a hydrocarbon, preferably natural gas, which is discharged through the fuel inlet pipe 60. The hydrocarbon fuel is supplied to said fuel inlet pipe 60 from any suitable source through a connection with the coupler 62 (Fig. 1). The proportions of hydrocarbon to air provided at this point are such as to produce a combustible mixture which is discharged as an annular sheath inside the converter and there burned. It has been found that locating the fuel injector 60 between the baffle plates 22 and 23 provides turbulent and thorough mixture of the fuel and air so that it is ready for combustion immediately upon being discharged into the discharge space 25 adjacent the furnace.

The mixture of hydrocarbon and axial air is discharged itno the resulting hot products of combustion.

The refractory 33 is cast in place in the cup-shaped member 32 and is securely held thereon by a plurality of fixed metallic members 65 which are welded to the base 34 of the cap 32 and extend outwardly in spaced relation thereto and toward the center thereof. The refractory 33 is a composite refractory body. It consists of separate pieces of preformed refractory material 66 each of which are placed on end on the cup 32 and a continuous refractory mass which is cast around said separate pieces of preformed refractory material 66 and said metallic members 65. This provides a refractory which is securely held in place in the cup and which is sufficiently strong to withstand the heats imposed thereon without spalling or crumbling.

The hydrocarbon injector pipe 42 and the cap 43 are readily removed from the assembly by removal of the cap 40 which carries the entire assembly with it.

In order to facilitate handling of the header and injector, a suitable handle 70 is welded to the outer circumference of the said shell 10.

The injector of the present invention is operated in the following manner:

Primary air is introduced through the primary air connection 24 into the shell 10. The primary air is moved along through the baffle plate 22 and forms a combustible mixture with fuel introduced through the fuel inlet pipe 60. The combustible mixture is moved through the baffle plate 23 and around the cup-shaped member or flame stabilizing ring 32 and refractory annulus 33 into the combustion chamber of the furnace (not shown) where it burns at high temperatures.

The hydrocarbon oil vapors are introduced through the pipe 42 and out the cap 43 into the combustion chamber of the furnace. At the same time, axial air is introduced through the pipe 38 into the header 37, through the axial air tube 30 and out the free end of said tube 30 adjacent the cap 43 into the combustion chamber of the furnace. The mixture of hydrocarbon oil vapors and axial air is such that there is incomplete combustion. Thus, the primary air and fuel forms a burning sheath in the furnace which surrounds the mixture of hydrocarbon oil vapors and air to decompose the unburned hydrocarbon oil vapors and form carbon black.

Having thus described our invention, we claim:

1. An injector particularly adapted for use with a carbon black furnace and comprising a hydrocarbon inlet pipe having a discharge cap on the end thereof, an axial air tube concentric with and spaced from said hydrocarbon inlet pipe, an annulus affixed to the end of said axial air tube concentric with and spaced from the discharge end of said hydrocarbon inlet pipe and said discharge cap the other end of said axial air tube being connected with a source of air to provide axially directed air to mix with the hydrocarbon from the said discharge cap, a tubular sleeve disposed around said axial air tube and terminating in an open end a predetermined distance short of the end of said axial air tube, means on said annulus to space said annulus a predetermined distance from the open end of said tubular sleeve, an outer shell open at one end and concentric with and spaced from said tubular sleeve and forming a primary air passage therebetween, a primary air inlet communicating with said primary air passage and fuel inlet means communicating with said primary air passage.

2. An injector as claimed in claim 1 and further characterized in that a pair of spaced perforated baffles are positioned in said primary air passage extending between said tubular sleeve and said outer shell and said fuel inlet opens into said primary air passage at a point between said baffles.

References Cited in the file of this patent

UNITED STATES PATENTS

| Number | Name | Date |
| --- | --- | --- |
| 351,390 | Mitchell | Oct. 26, 1886 |
| 741,504 | Kemp | Oct. 3, 1903 |
| 1,677,811 | Bowen | July 17, 1928 |
| 1,872,907 | Doherty | Aug. 23, 1932 |
| 1,891,835 | Perry | Dec. 20, 1932 |
| 2,039,937 | Shroeder | May 5, 1936 |
| 2,259,818 | Henriksen | Oct. 21, 1941 |
| 2,274,818 | Zink | Mar. 3, 1942 |
| 2,458,542 | Urquhart | Jan. 11, 1949 |
| 2,458,543 | Urquhart | Jan. 11, 1949 |
| 2,553,199 | Loving | May 15, 1951 |
| 2,625,466 | Williams | Jan. 13, 1953 |
| 2,682,450 | Sweigart | June 29, 1954 |